United States Patent
Hillel et al.

(10) Patent No.: US 12,465,882 B2
(45) Date of Patent: Nov. 11, 2025

(54) CARBON DIOXIDE CAPTURE

(71) Applicant: ROLLS-ROYCE plc, London (GB)

(72) Inventors: Malcolm Hillel, Derby (GB); Philip Butler, Ashbourne (GB); Christopher Clay, Derby (GB)

(73) Assignee: ROLLS-ROYCE plc, London (GB)

( * ) Notice: Subject to any disclaimer, the term of this patent is extended or adjusted under 35 U.S.C. 154(b) by 366 days.

(21) Appl. No.: 18/025,953

(22) PCT Filed: Aug. 23, 2021

(86) PCT No.: PCT/EP2021/073220
§ 371 (c)(1),
(2) Date: Mar. 13, 2023

(87) PCT Pub. No.: WO2022/058125
PCT Pub. Date: Mar. 24, 2022

(65) Prior Publication Data
US 2023/0347276 A1    Nov. 2, 2023

(30) Foreign Application Priority Data
Sep. 21, 2020 (GB) ..................... 2014830

(51) Int. Cl.
*B01D 53/04* (2006.01)
*G21D 1/02* (2006.01)

(52) U.S. Cl.
CPC .... *B01D 53/0462* (2013.01); *B01D 2253/206* (2013.01); *B01D 2257/504* (2013.01); *B01D 2258/06* (2013.01); *G21D 1/02* (2013.01)

(58) Field of Classification Search
CPC .............. B01D 53/0462; B01D 53/04; B01D 2253/206; B01D 2257/504;
(Continued)

(56) References Cited

U.S. PATENT DOCUMENTS

2011/0296872 A1   12/2011   Eisenberger
2012/0255305 A1*  10/2012   Iijima ................ B01D 53/1475
                                                      60/670
(Continued)

FOREIGN PATENT DOCUMENTS

CN     210385368 U  *  4/2020   ......... B01D 53/1425
GB        2552010 A     1/2018
WO    2008/144708 A1   11/2008

OTHER PUBLICATIONS

Machine-generated English translation of CN 210385368 U, published Apr. 24, 2020.*

(Continued)

*Primary Examiner* — Frank M Lawrence, Jr.
(74) *Attorney, Agent, or Firm* — Oliff PLC

(57) ABSTRACT

A system for capture of atmospheric carbon dioxide. The system includes a carbon dioxide capture device having a capture medium operable to capture atmospheric carbon dioxide under a first set of thermodynamic conditions, and to release carbon dioxide under a second set of thermodynamic conditions different to the first set of thermodynamic conditions. The first set of thermodynamic conditions includes a first temperature range and the second set of thermodynamic conditions includes a second temperature range. A heat engine is configured receive a working fluid at an inlet temperature and arranged to discharge at least a portion of the working fluid at a discharge temperature in the second temperature range or higher, and a heat transfer arrangement is configured to convey heat from discharged working fluid to the capture medium to release carbon dioxide therefrom.

15 Claims, 9 Drawing Sheets

(58) Field of Classification Search
CPC ............ B01D 2258/06; B01D 2259/65; B01D 53/0407; B01D 53/0438; G21D 1/02; Y02C 20/40; Y02E 20/14
USPC .............. 96/108, 121, 126–128; 95/114, 139
See application file for complete search history.

(56) References Cited

U.S. PATENT DOCUMENTS

| | | | |
|---|---|---|---|
| 2014/0105809 A1* | 4/2014 | Okumura | B01D 53/04 422/177 |
| 2014/0130670 A1* | 5/2014 | Eisenberger | B65G 5/00 95/139 |
| 2017/0203249 A1 | 7/2017 | Gebald et al. | |
| 2018/0326352 A1* | 11/2018 | Davidian | C01B 3/02 |
| 2020/0009504 A1 | 1/2020 | Eisenberger | |

OTHER PUBLICATIONS

Internet Document "Thorium-based nuclear power" (https://en.wikipedia.org/wiki/Thorium-based_nuclear_power), retrieved May 8, 2025.*
Dec. 21, 2021 International Search Report issued in International Patent Application No. PCT/EP2021/073220.
Dec. 21, 2021 Written Opinion issued in International Patent Application No. PCT/EP2021/073220.
Feb. 26, 2021 Search Report issued in British Patent Application No. 2014830.0.

* cited by examiner

CARBON DIOXIDE CAPTURE

CROSS REFERENCE TO RELATED DOCUMENTS

Priority is herewith claimed under 35 U.S.C. § 119 (e) from GB Patent Application No. GB2014830.0, filed Sep. 21, 2020, and WIPO Patent application PCT/EP2021/073220 filed Aug. 23, 2021, both entitled "CARBON DIOXIDE CAPTURE," by Rolls-Royce plc and which are hereby incorporated by reference in its entirety.

TECHNICAL FIELD

This disclosure relates to capture of atmospheric carbon dioxide.

BACKGROUND

Direct air capture of atmospheric carbon dioxide typically involves encouraging an airflow over, for example, a sorbent capture medium under thermodynamic conditions in which the medium will sorb carbon dioxide from the air. By altering the thermodynamic conditions, the medium may release the carbon dioxide in a desorption process allowing it to be captured and stored.

The release phase typically requires an increase in temperature. Whilst the temperature rise is modest, for capture of sufficient quantities of carbon dioxide to either facilitate meaningful carbon capture and storage or hydrocarbon fuel synthesis, the overall energy requirements to achieve this temperature increase can become impractically high.

SUMMARY

The invention is directed to systems and methods for capture of atmospheric carbon dioxide.

One such system comprises a carbon dioxide capture device having a capture medium, a heat engine using a working fluid, and a heat transfer arrangement configured to convey heat from working fluid discharged from the heat engine to the capture medium to release captured carbon dioxide.

The carbon dioxide capture device comprises a capture medium operable to capture atmospheric carbon dioxide under a first set of thermodynamic conditions, and to release carbon dioxide under a second set of thermodynamic conditions different to the first set of thermodynamic conditions, the first set of thermodynamic conditions comprising a first temperature range and the second set of thermodynamic conditions comprising a second temperature range.

The heat engine is configured receive a working fluid at an inlet temperature and arranged to discharge at least a portion of the working fluid at a discharge temperature lower than the inlet temperature.

The heat transfer arrangement configured to convey heat from discharged working fluid at the discharge temperature to the capture medium to release carbon dioxide therefrom.

In an embodiment, the heat engine is connected to an electrical generator.

In an embodiment, the carbon dioxide capture device comprises one or more electrically-powered fans electrically connected with the electrical generator, said fans being arranged to draw atmospheric air over the capture medium.

In an embodiment, the first temperature range is up to 80 degrees Celsius and the second temperature range from 80 to 120 degrees Celsius.

In an embodiment, the capture medium is a sorbent material operable to capture carbon dioxide by a sorbing process at the first temperature range and a desorbing process at the second temperature range. In an embodiment, the capture medium comprises an adsorbent. In an embodiment, the capture medium comprises an absorbent. In an embodiment, the capture medium comprises an ion-exchange material.

In an embodiment, the heat engine comprises a first heat engine and a second heat engine in series, wherein the at least a portion of the working fluid is discharged between the first heat engine and the second heat engine.

In an embodiment, the first heat engine is configured to operate between said inlet temperature and said discharge temperature, and the second heat engine is configured to operate between an intermediate temperature and an outlet temperature. In an embodiment, the intermediate temperature is less than the discharge temperature.

In an embodiment, the heat engine is a multistage turbine having a first stage and final stage, and said at least a portion of the working fluid is discharged at a discharge station between the first stage and the final stage.

In an embodiment, the heat transfer arrangement comprises a heat exchanger configured to transfer heat from the working fluid to a separate, secondary fluid for conveying heat to the capture medium.

In an embodiment, the working fluid is steam and the heat engine comprises a steam turbine.

There is also provided a cogeneration plant for generation of electricity and capture of atmospheric carbon dioxide, comprising a system of the aforesaid type, along with a heat source for raising the temperature of the working fluid.

In an embodiment, the heat source is a nuclear reactor.

In an embodiment, the nuclear reactor is a gas-cooled reactor or a pressurised water reactor, and steam is provided by a steam generator in heat exchange relationship with the nuclear reactor.

In an embodiment, the nuclear reactor is a boiling water reactor, and steam is provided by the boiling water reactor.

In an embodiment, the heat source utilises hydrocarbon combustion and the cogeneration plant further comprises a carbon dioxide capture and storage system to capture carbon dioxide from an exhaust of the heat source.

There is also provided a method of capturing atmospheric carbon dioxide, comprising:
  generating steam;
  expanding said steam through a steam turbine and producing a steam exhaust;
  directing heat from the steam exhaust to a direct air carbon capture plant;
  desorbing, by said heat, carbon dioxide captured in a capture medium in the direct air carbon capture plant.

In an embodiment, the steam is generated using heat from a nuclear reactor.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
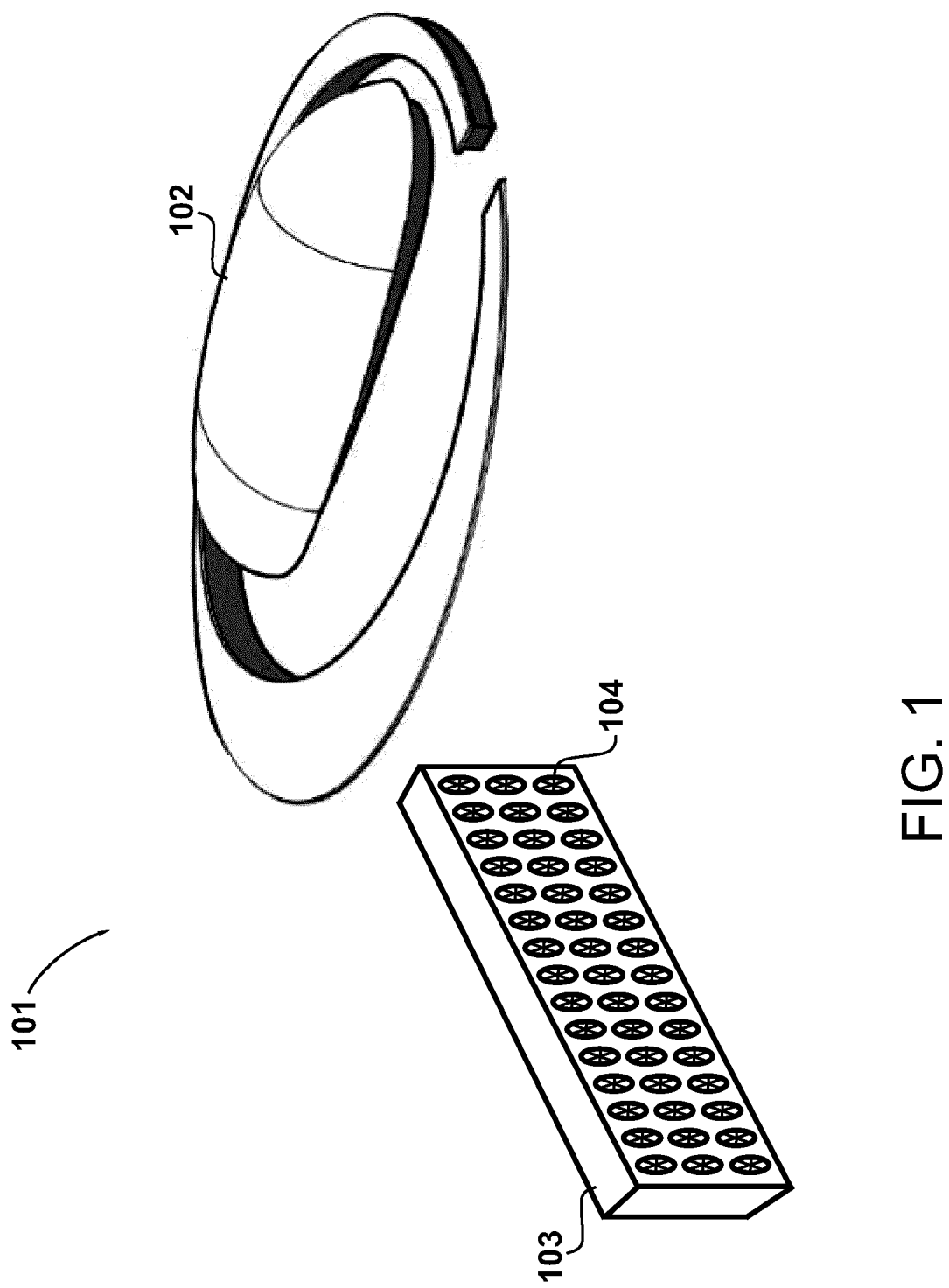
FIG. 1 shows a cogeneration plant for capture of atmospheric carbon dioxide.

A cogeneration plant 101 for capture of atmospheric carbon dioxide is shown in FIG. 1.

The cogeneration plant 101 principally comprises heat source coupled to a system for capture of atmospheric carbon dioxide. In the present embodiment, the heat source is a nuclear reactor housed in a nuclear power plant 102. In the present example, the nuclear reactor power plant 102 is a modular reactor. A modular reactor may be considered as a reactor comprised of a number of modules that are manufactured off-site (e.g. in a factory), with the modules being assembled to form the plant on site by connecting the modules together.

The nuclear power plant 102 also houses a heat engine and a heat transfer arrangement for conveying heat to a carbon dioxide capture device.

In this embodiment, the carbon dioxide capture device is a direct air capture device 103 having a plurality of fans 104 for drawing in atmospheric air from which carbon dioxide may be removed. It is envisaged however that natural airflow may be used in other implementations.

The overall configuration of the system for capture of atmospheric carbon dioxide will be described further with reference to FIGS. 2 to 8, and the optionality for heat source types will be described with reference to FIGS. 9 through 12.

FIG. 2

Figure 2:
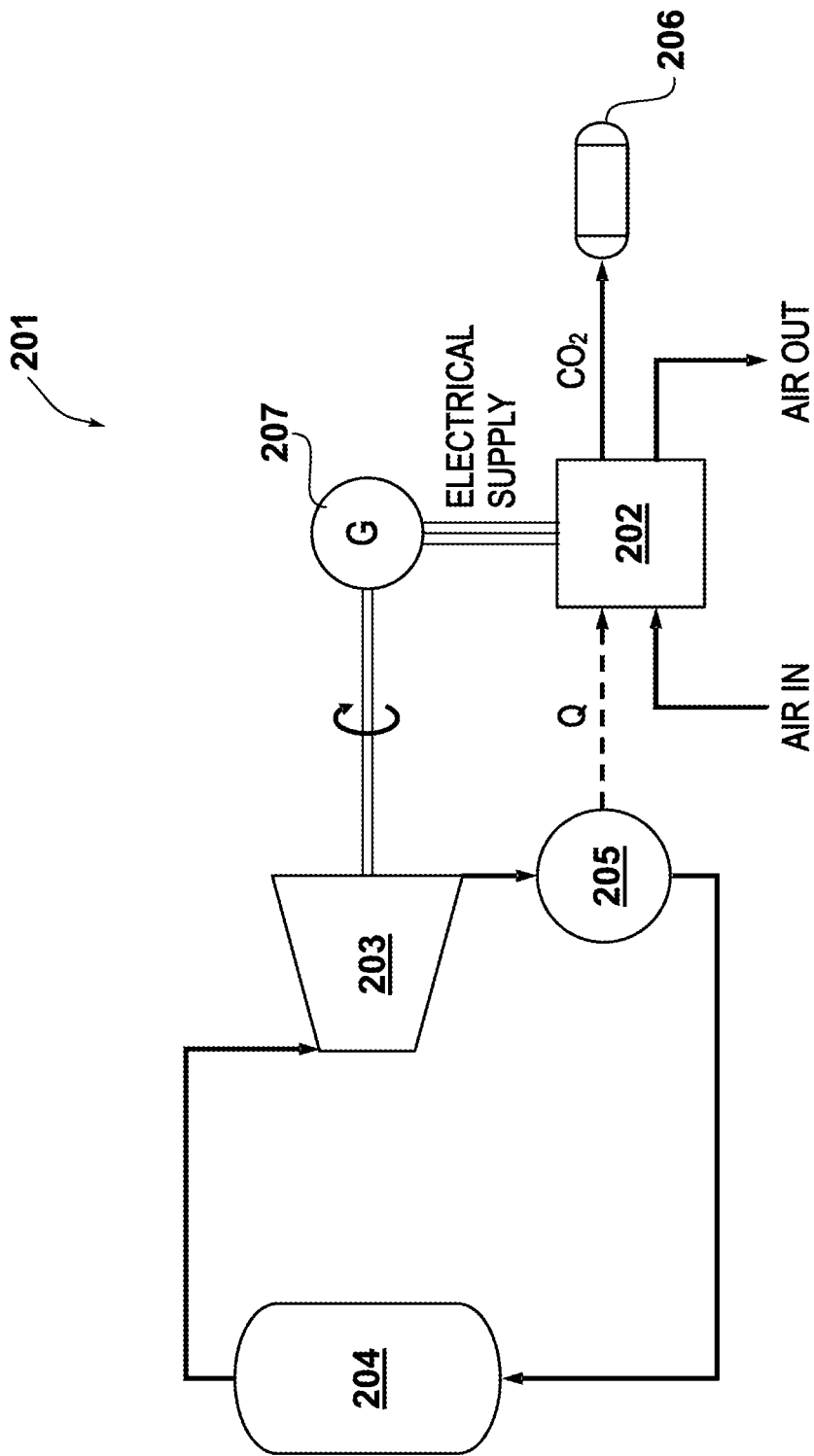
FIG. 2 shows a configuration of a system for capture of atmospheric carbon dioxide.

The configuration of an embodiment of the system for capture of atmospheric carbon dioxide is shown in FIG. 2.

The system 201 comprises a carbon dioxide capture device 202 which has located therein a capture medium. In the present embodiment, atmospheric carbon dioxide is captured from inlet air under a first set of thermodynamic conditions, and released under a second set of thermodynamic conditions. In this example, the first set of thermodynamic conditions comprises a first temperature range, whilst the second set of thermodynamic conditions comprises a second temperature range different to the first temperature range. Such a process may be characterised as a temperature-swing process. In a specific embodiment, the first temperature range is up to 80 degrees Celsius, for example an ambient temperature, and the second temperature range is from 80 to 120 degrees Celsius, for example 100 degrees Celsius.

It is envisaged that in alternative embodiments, the first and second sets of thermodynamic conditions may relate to pressure, known as a pressure-swing process. A combination thereof may also be used.

The system 201 further comprises a heat engine 203 for development of work. In operation, the heat engine 203 receives working fluid heated by, in this embodiment, a heat source 204. As described previously, in the present embodiment, the heat source 204 is a nuclear reactor. The configuration of the possible reactor types will be described further with reference to FIGS. 9 and 10. It is envisaged that other heat sources could be used, with some examples being described with references to FIGS. 11 and 12.

Referring again to FIG. 2, in this example, mechanical work W developed by the heat engine 203 is converted into electrical energy by an electrical generator 207.

As described previously with reference to FIG. 1, the carbon dioxide capture device 202 is in a specific example a direct air capture device and is in particular of the type comprising fans or equivalent for driving airflow through the said device. Thus, in the present example, the carbon dioxide capture device 202 is connected via an electrical supply to the electrical generator 207.

Following development of work W by the heat engine 203, at least a portion of the working fluid is discharged to a heat transfer arrangement 205. As shown by arrow Q, the heat transfer arrangement 205 conveys heat for facilitating release of carbon dioxide from the capture medium in the carbon dioxide capture device 202. In the present embodiment, carbon dioxide released during this release process is stored in a tank 206. The working fluid then returns to the heat source 204 for re-heating, possibly via a condenser and/or a preheater depending on the cycle implementation.

As will be appreciated by those skilled in the art, most practical nuclear reactors such as those of the present embodiment utilise a steam working fluid and thus the associated heat engine 203 comprises one or more steam turbines. It will also be appreciated that in order to achieve the maximum cycle efficiency, the temperature of the water working fluid is reduced to a very low level, and in many designs is even reduced below 100 degrees Celsius in the turbine system. In normal circumstances, the lowest cycle temperature is too low for any more useful work to be developed. Proposals have been made for use of the remaining low-grade heat in district heating systems, however this has attendant issues in terms of imposing a requirement for the nuclear plant to be located close to a municipality. Thus in many circumstances, around two-thirds of the thermal energy produced by the nuclear reactor is rejected as heat to the environment.

The inventors have determined that the second temperature range required for release of captured carbon dioxide is of a similar order to the outlet temperature of heat engines used in energy generation, and thus instead of rejecting heat to the environment it may be used to drive the carbon dioxide release process.

FIG. 3

Figure 3:
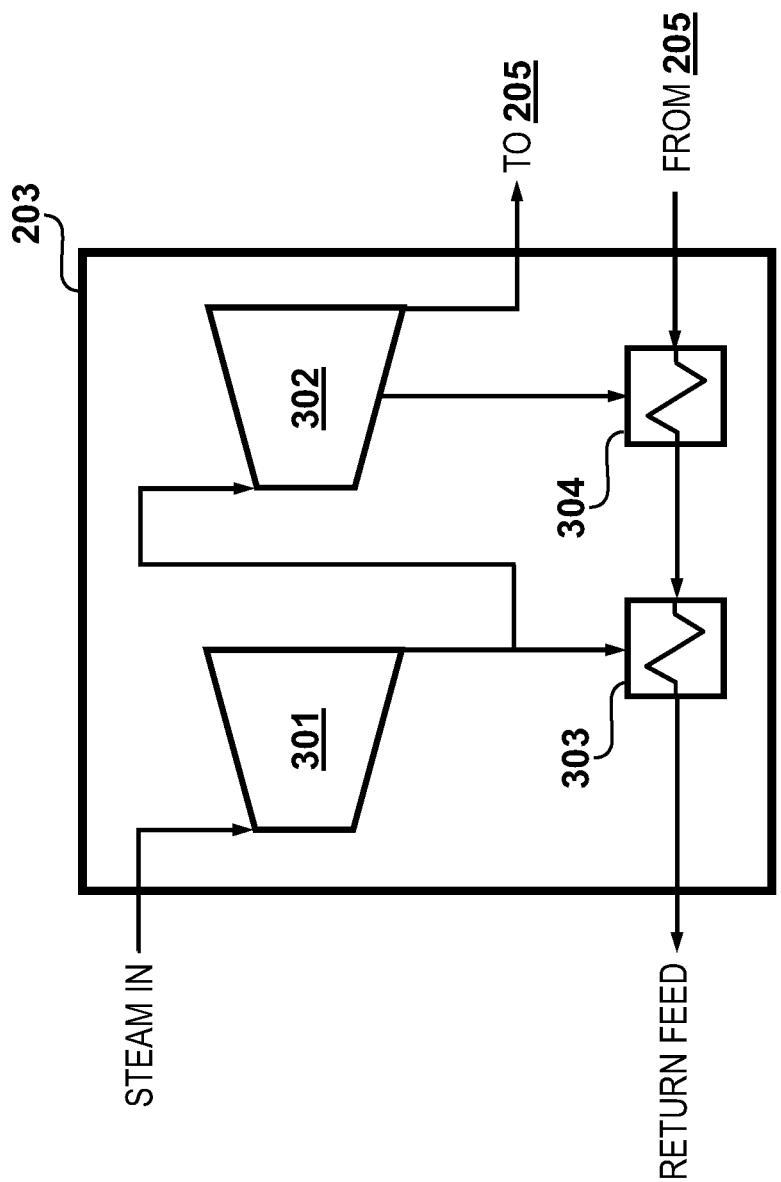
FIG. 3 shows an embodiment of the heat engine of the system of FIG. 2.

In the embodiment of FIG. 3, the heat engine 203 is specifically adapted so that the minimum temperature of the working fluid is at a discharge temperature in the second temperature range or higher. Whilst this means less work is developed by the heat engine 203 than is theoretically possible, it means that no reheat is required to drive the release process in the carbon dioxide capture device 202.

In the simplified example of FIG. 3, in which the working fluid is steam, the heat engine 203 comprises a high-pressure turbine 301 and a low-pressure turbine 302 in series, which configuration will be familiar to those skilled in the art.

In the present example, both the high- and low-pressure turbines comprise a plurality of stages. An output from the high-pressure turbine 301 is split, with the majority directed to the low-pressure turbine 302 and the remainder supplied to a high-pressure preheater system 303 for the return feed. The low-pressure turbine 302 expands the steam to a discharge temperature at its output, which is within the second temperature range or higher. Thus, in a specific example, the discharge temperature is 100 degrees Celsius. It will be appreciated by those skilled in the art that this is a greater temperature than is theoretically possible, and thus it is possible to either reduce the number of stages in either or both of the high- and low-pressure turbines, or reduce the stage loadings thereof to improve expansion efficiency.

The discharged working fluid is provided to the heat transfer arrangement 205 which as described previously conveys heat to the carbon dioxide capture device 202. Returning steam passes through a low-pressure preheater system 304, which is fed by a mid-turbine bleed from the low-pressure turbine 302. As the returning fluid is at a higher temperature than would be encountered if the maximum expansion and heat recovery had been implemented in the low-pressure turbine—which can be as low as from 10 to 40 degrees Celsius following passage through a condenser—less preheating is required in the pre-heating systems 303 and 304. This improves overall cycle efficiency as less diversion is required from the output of the high-pressure turbine 301 and less interstage bleed is required from low-pressure turbine 302.

FIG. 4

Figure 4:
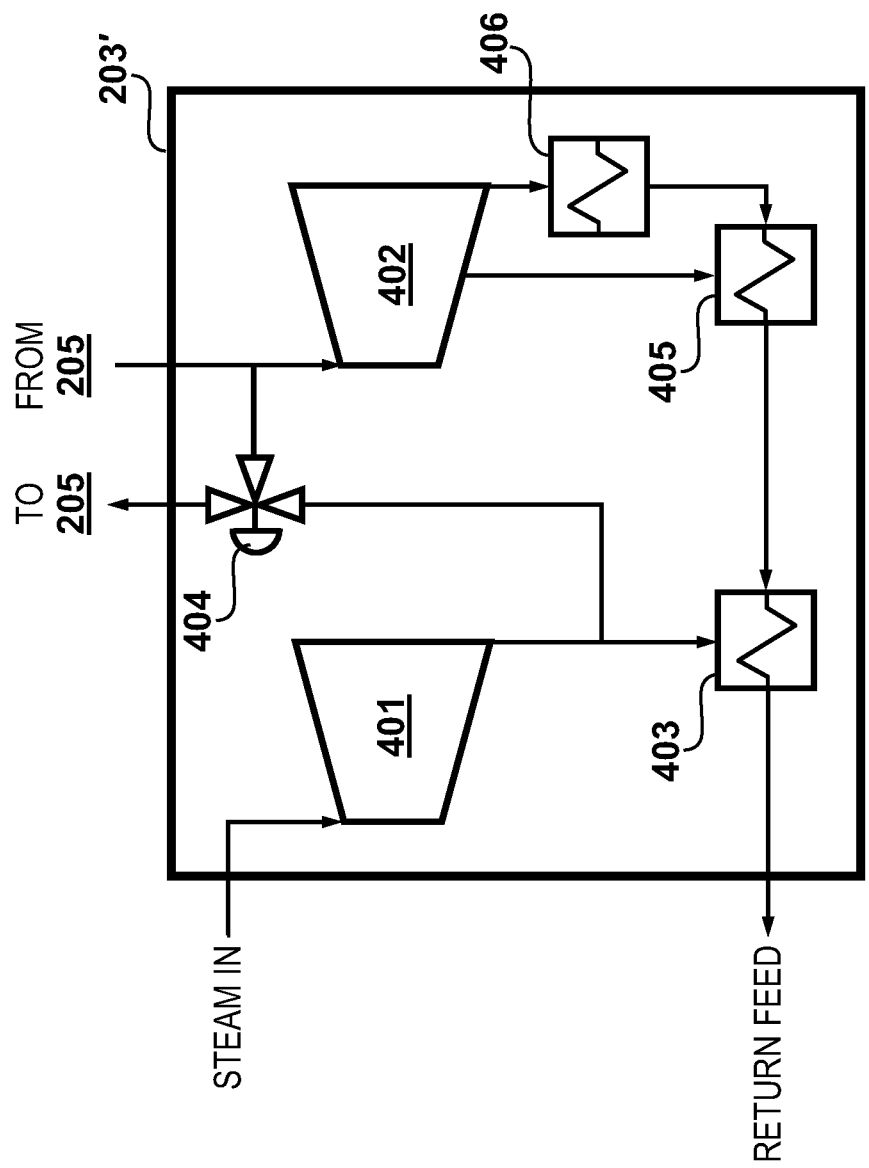
FIG. 4 shows another embodiment of the heat engine of the system of FIG. 2.

An alternative embodiment for the heat engine 203 is shown in FIG. 4, identified as 203'.

In this embodiment, the heat engine 203' comprises a first heat engine and a second heat engine in series. The first heat engine is configured to operate between an inlet temperature and the discharge temperature as described previously. In this example, the discharge temperature may be greater than the second temperature range. The second heat engine is configured to operate between an intermediate temperature and an outlet temperature. In a specific embodiment, the intermediate temperature is lower than the discharge temperature as heat is conveyed to the carbon dioxide capture device 202. Alternatively, a reheater may be used to bring the intermediate temperature above the return temperature from the heat transfer arrangement 205.

In the simplified example of FIG. 4, again in which the working fluid is steam, the aforesaid first heat engine is a high-pressure turbine 401 and the aforesaid second heat engine is a low-pressure turbine 402 configured in series. Again, this arrangement will be familiar to those skilled in the art.

As with the example of FIG. 3, the heat engine 203' is configured so that a portion of the output from the high-pressure turbine 401 is provided to a high-pressure preheater system 403 for the return feed. The rest of the output from the high-pressure turbine 401 passes in this example to a three-way valve 404 which is configured to control the portion of the output from the high-pressure turbine 401 directed to the low-pressure turbine, and the portion discharged to the heat transfer arrangement 205. The valve 404 permits metering of the correct amount of steam for the required quantity of heat Q for the carbon dioxide release process.

In an alternative embodiment, the valve 404 could be omitted with all of the steam being discharged at the discharge temperature to the heat transfer arrangement. In such an implementation it is envisaged that control of the quantity of heat supplied to the carbon dioxide capture device 206 could be controlled by means such as flow rate control, etc.

As with the example of FIG. 3, an interstage bleed in the low-pressure turbine 402 supplies steam to a low-pressure preheater 405. A condenser 406 condenses the steam following maximum expansion and optimal energy recovery in the low-pressure turbine 402.

In an alternative embodiment, it is envisaged that the required portion of working fluid may be discharged from a discharge station between the first and final stages in a multi-stage turbine, such as the interstage bleed point identified on the low-pressure turbines 302 and 402. In such a configuration, the turbine design and discharge station may be selected such that the discharge temperature is within or greater than the second temperature range.

FIGS. 5 & 6

Figure 6:
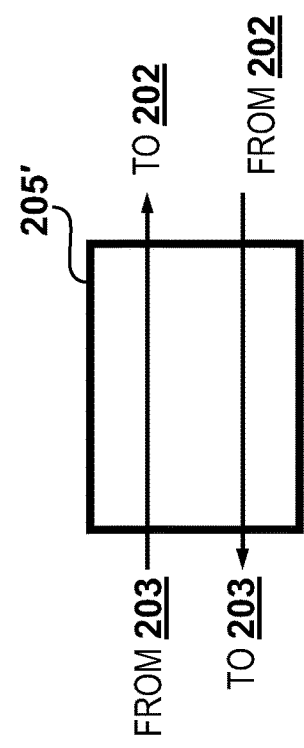
FIG. 6 shows another embodiment of the heat transfer arrangement of the system of FIG. 2.
Figure 5:
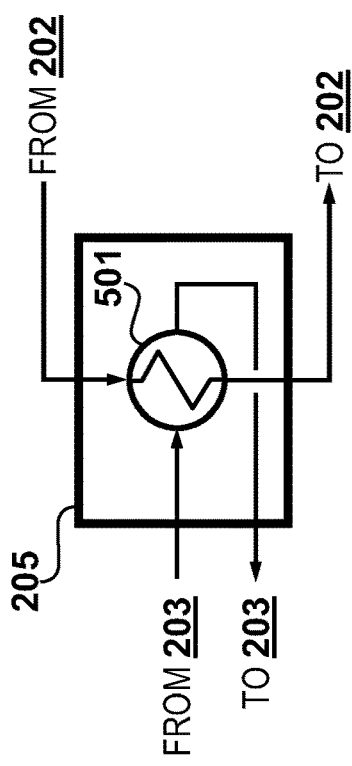
FIG. 5 shows an embodiment of the heat transfer arrangement of the system of FIG. 2.

Two embodiments of the heat transfer arrangement 205 are shown in FIGS. 5 and 6, respectively.

In a first embodiment illustrated in FIG. 5, the heat transfer arrangement 205 comprises a heat exchanger 501 configured to transfer heat from the working fluid to a separate, secondary fluid for conveying heat to the capture medium. In the present example, in which the working fluid is steam, the secondary fluid is water and the heat exchanger 501 is a condensing heat exchanger, which makes it particularly suitable for combination with the embodiment of the heat engine 203 described with reference to FIG. 3. Further, this configuration provides isolation of and thus reduces risk of contamination of the working fluid circulating between the heat source 204, heat engine 203 and heat transfer arrangement 205 by the carbon dioxide capture device 202. This is particularly beneficial for embodiments of the cogeneration plant in which the heat source is a nuclear reactor.

In the alternative embodiment of FIG. 6, the heat transfer arrangement, identified as 205', simply comprises supply conduit for transporting working fluid to and from the carbon dioxide capture device 202. This arrangement may be more suitable for embodiments of the cogeneration plant in which the balance of plant is not as sensitive to the possibility of water contamination.

FIGS. 7 & 8

Figure 7:
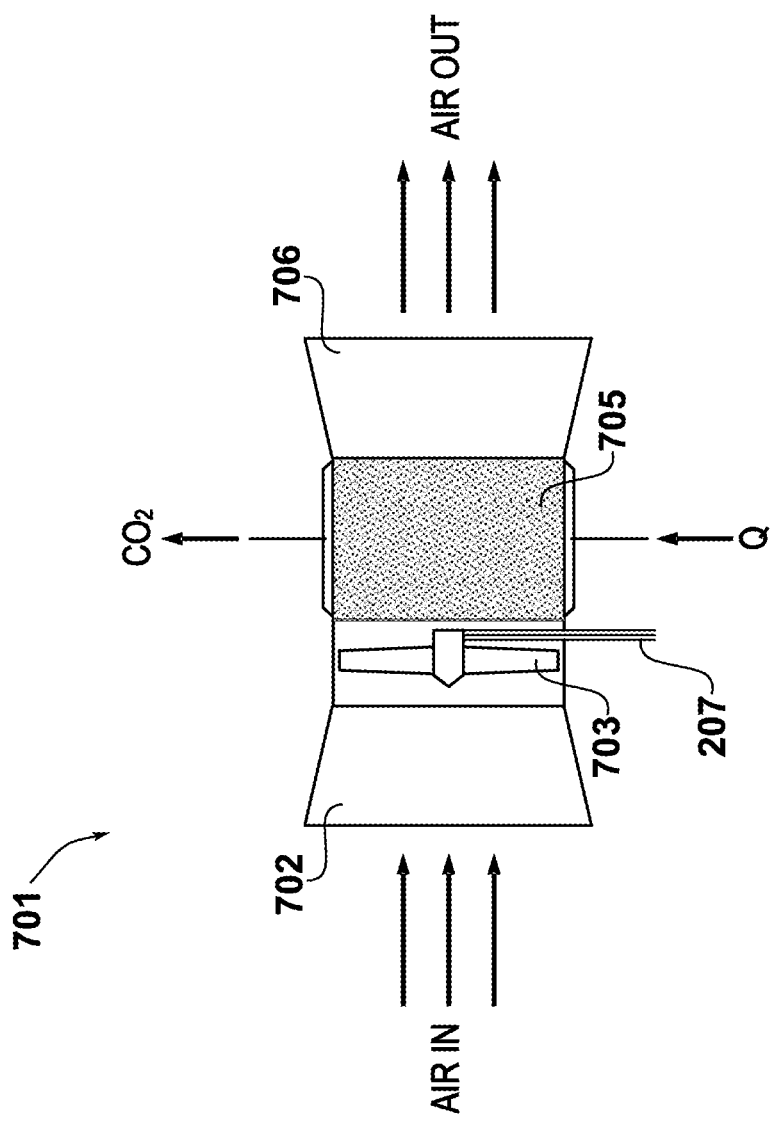
FIG. 7 shows an embodiment of the carbon dioxide capture device of the system of FIG. 2.

As described previously with reference to FIG. 1, practical implementations of the carbon dioxide capture device 202 may be what are termed in the art direct air capture devices. Given the low concentration of carbon dioxide in atmospheric air, it is necessary to drive large mass flows of air through such devices in order to obtain a meaningful yield of carbon dioxide. Thus, many direct air capture devices comprise a large number of direct air capture units, which are stacked together to form the overall installation. In the present embodiment, the carbon dioxide capture device 202 is configured in this way, and thus comprises a plurality of direct air capture units, one example of which is shown in FIG. 7 at 701.

The direct air capture unit 701 comprises an intake 702 for receiving atmospheric air drawn in by means of a fan 703. In this embodiment, the fan 703 is an electrically-powered fan. In a specific embodiment, the fan 703 is electrically connected with the generator 207.

During a capture process, the atmospheric air is forced over a capture medium 705 as described previously. In the present embodiment, the capture medium is permeable to allow air to flow over and through it. In a specific embodiment, the capture medium is formed as a matrix structure. In this example, the capture medium 705 is a sorbent material operable to capture carbon dioxide by a sorbing process at the first temperature range and a desorbing process at the second temperature range. In this specific embodiment, the capture medium 705 comprises an adsorbent, in particular a functionalised ion-exchange material such as an amine functionalised material. Alternatively the capture medium 705 may comprise an absorbent. Such capture mediums will be familiar to those skilled in the art. Air having a reduced carbon dioxide concentration leaves the direct air capture unit 701 via an exhaust 706.

During a release process, the intake 702 and the exhaust 706 are closed, possibly by means of a valve or barn-door arrangement for example (not shown). This seals the volume in the unit housing the capture medium 705, whereupon heat Q in the second temperature range from the heat transfer arrangement 205 may be provided to cause release of the carbon dioxide captured by the capture medium 705. In the present example, the heat Q is supplied by means of the secondary fluid described with reference to FIG. 5. In particular, steam in the range of from 80 to 100 degrees Celsius (or higher depending on the cycle configuration) permeates the capture medium 705. Carbon dioxide released during this process may then be directed to the tank 206 after being separated from the steam. Such separation processes will be familiar to those skilled in the art, for example a condenser or a compressor may be used to cause a change in phase, with liquid water being pumped back to the heat transfer arrangement 205 and gaseous carbon dioxide remaining for storage in the tank 206

It is envisaged that other configurations of direct air capture units may be used, for examples ones in which heat is supplied through conduit passing through the capture medium.

Clearly, heat Q is not required during the capture process, and so in a specific embodiment a controllable manifold system may be provided to distribute heat only to the subset of direct air capture units undergoing the release process whilst others are in the capture phase. In this way, a constant load is placed on the heat engine 203 and the heat source 204, increasing efficiency. This is advantageous in a situation where the load on the electrical generator 207 is constant.

FIGS. 8 & 9

Figure 9:
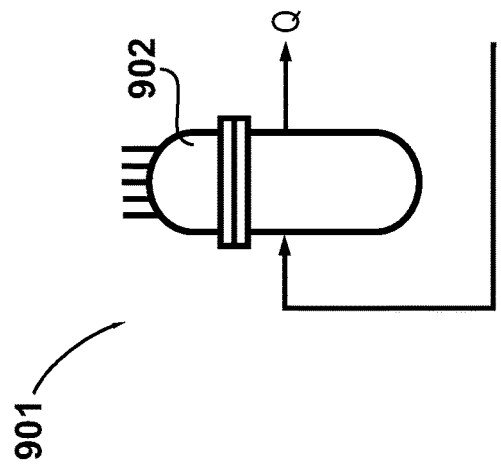
FIG. 9 shows another embodiment of a nuclear reactor for use as a heat source in the system of FIG. 2.
Figure 8:
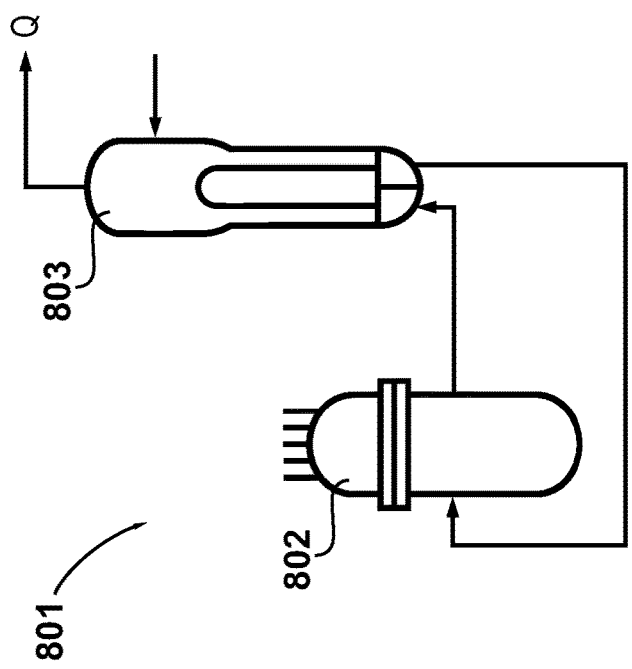
FIG. 8 shows an embodiment of a nuclear reactor for use as a heat source in the system of FIG. 2.

Examples of nuclear reactors suitable for the heat source 204 are shown in FIGS. 8 and 9.

A pressurised water reactor 801 is shown in FIG. 8. In the present example, water under high pressure is heated in the reactor pressure vessel 802, and is circulated in a primary circuit to a steam generator 803. Steam is raised for circulation in a secondary circuit to the steam turbines forming part of the heat engine. The steam in the secondary circuit may also be used for provision of heat to the carbon dioxide capture device 202. It will be appreciated by those skilled in the art that this configuration may also be used with a gas-cooled reactor, in which the primary circuit working fluid is a gas, for example carbon dioxide.

In an alternative embodiment, a boiling water reactor 901 as shown in FIG. 9 may be used as the heat source, in which the reactor pressure vessel 902 forms part of the same circuit as the heat engine 203. Steam is raised in the reactor pressure vessel which drives the steam turbines in the heat engine, and may be used for provision of heat to the carbon dioxide capture device 202.

Use of nuclear reactors effectively means the cogeneration plant 101 may be termed "carbon negative".

FIGS. 10 & 11

It is of course possible for the heat source 204 to utilise for example hydrocarbon fuels to drive the heat engine 203.

Figure 10:
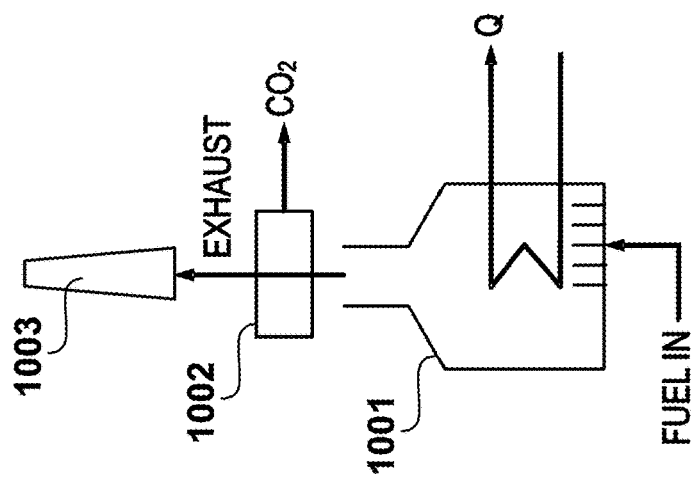
FIG. 10 shows an embodiment of a hydrocarbon-burning plant for use as a heat source in the system of FIG. 2.

As shown in FIG. 10, in one embodiment, fuel, such as coal, may be burnt in a furnace 1001 which heats working fluid such as steam. In this example, flue gases are passed through a carbon capture and storage system 1002. The carbon capture and storage system is configured to scrub carbon dioxide from the flue gases prior to their emission through an exhaust stack 1003. The scrubbed carbon dioxide may be stored in tank 206 along with atmospheric carbon dioxide captured by the carbon dioxide capture device 202.

Figure 11:
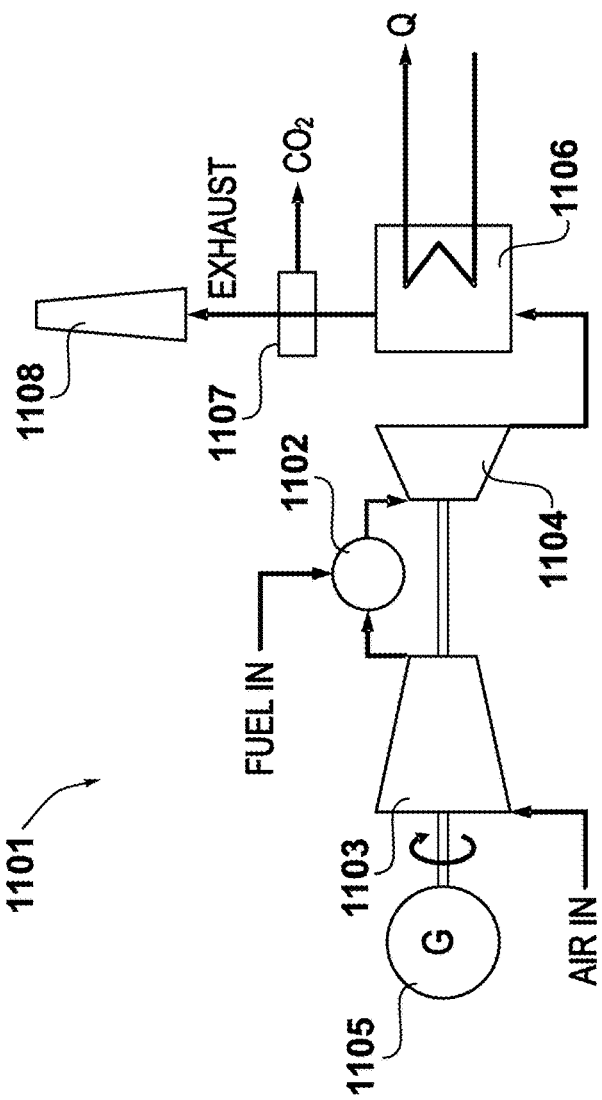
FIG. 11 shows another embodiment of a hydrocarbon-burning plant for use as a heat source in the system of FIG. 2.

As shown in FIG. 11, a similar approach may be taken in installations in which the heat source 204 is a combined cycle 1101. Those skilled in the art will be familiar with such plant types, in which hydrocarbon fuel, such as natural gas, is burnt in a combustor 1102 supplied with compressed air from a compressor 1103. Exhaust gases drive a turbine 1104 which drives the compressor 1103 and a generator 1105. Following expansion in the turbine 1104, the exhaust gases still contain a significant amount of enthalpy which is recovered in a boiler 1106 for driving a steam cycle. Thus in this example, the boiler 1106 raises steam for provision to the heat engine 203. As with the example of FIG. 10, a carbon capture and storage system 1107 of the same configuration may be used to scrub carbon dioxide from the flue gases prior to release through an exhaust stack 1108.

FIG. 12

Figure 12:
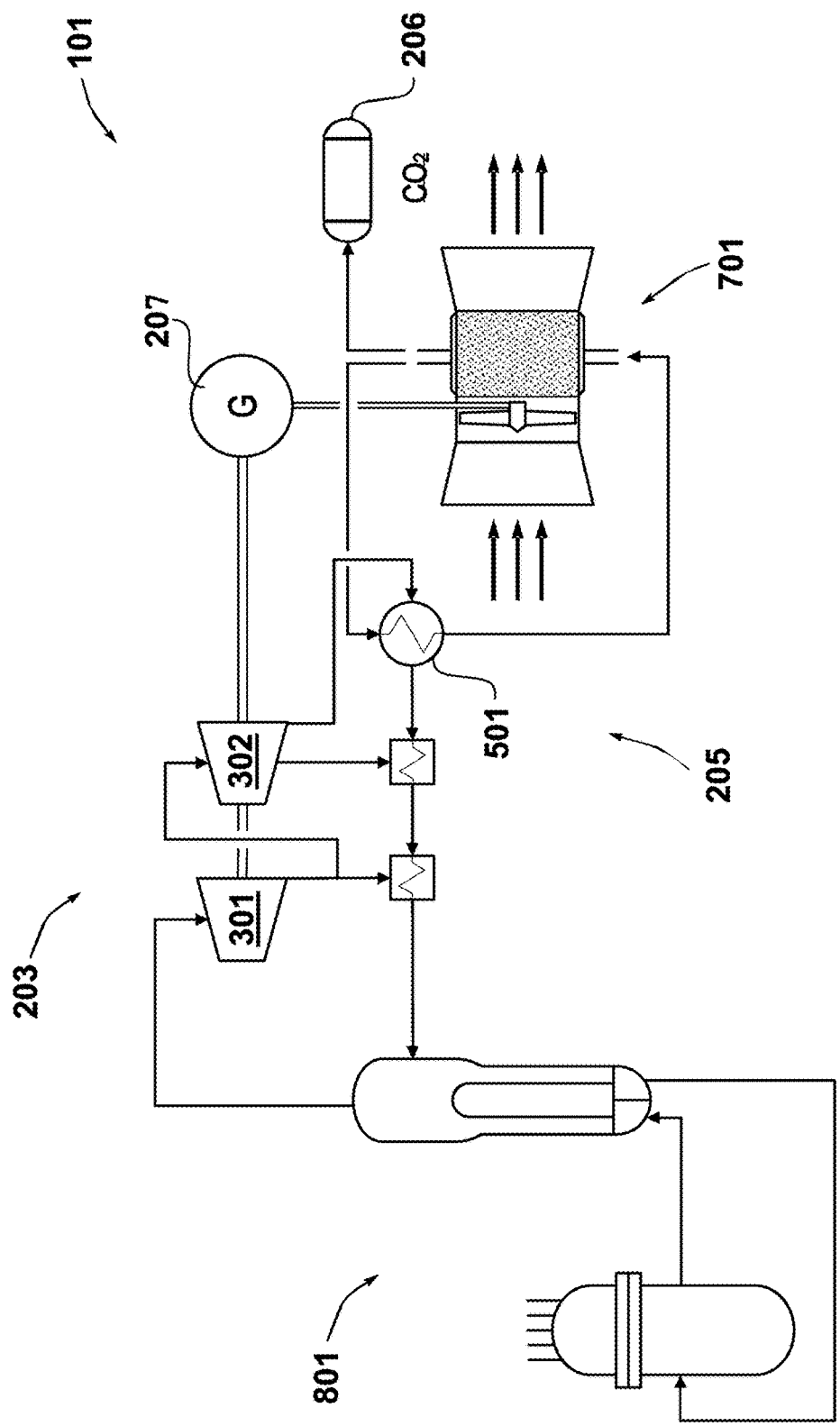
FIG. 12 shows an embodiment of the overall system configuration for the cogeneration plant of FIG. 1.

An example overall system configuration of the cogeneration plant 101 is shown in FIG. 12, which utilises a selection of the approaches described herein for the different functional components.

In particular, the heat source 204 is the pressurised water reactor 801 of FIG. 8, the heat engine 203 is the steam turbine arrangement of FIG. 3, the heat transfer arrangement 205 is the condensing heat exchanger of FIG. 5, and the carbon dioxide capture device is the direct air capture units 701 of FIG. 7.

Thus in this example, the low-pressure turbine 302 recovers less enthalpy than is theoretically possible from the steam, so as to facilitate provision of steam to the heat exchanger 501 at a temperature in or greater than the second temperature range required by the direct air capture units 701 for release of captured carbon dioxide.

In this example, the pressurised water reactor 801 is configured to produce 1300 megawatts of thermal power. In a design optimised purely for power generation, it has been found it is possible to convert 450 megawatts into electrical power. In the example system configuration of FIG. 12, the steam is only expanded in the low-pressure turbine 302 down to 100 degrees Celsius. It has been found that this reduces the electrical output to 333 megawatts.

However, the amount of heat that can be conveyed to the carbon dioxide capture device is sufficient to achieve capture of approximately 10000 tonnes of atmospheric carbon dioxide per day. It has been found that the amount of electrical power required to draw air into the direct air capture units 701 would be around 113 megawatts, leaving around 210 megawatts for export to, for example, a national electrical grid or a local microgrid.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A system for capture of atmospheric carbon dioxide, comprising:
   a carbon dioxide capture device having a capture medium operable to capture atmospheric carbon dioxide under a first set of thermodynamic conditions, and to release carbon dioxide under a second set of thermodynamic conditions different to the first set of thermodynamic conditions, the first set of thermodynamic conditions comprising a first temperature range and the second set of thermodynamic conditions comprising a second temperature range;
   a heat engine configured receive a working fluid at an inlet temperature and arranged to discharge at least a portion of the working fluid at a discharge temperature in the second temperature range or higher;
   a heat transfer arrangement configured to convey heat from discharged working fluid to the capture medium to release carbon dioxide therefrom, wherein the heat transfer arrangement comprises a heat exchanger configured to transfer heat from the working fluid to a separate, secondary fluid that conveys heat to the capture medium.

2. The system of claim 1, in which the heat engine is connected to an electrical generator, and
   the carbon dioxide capture device comprises one or more electrically-powered fans electrically connected with the electrical generator, the fans being arranged to draw atmospheric air over the capture medium.

3. The system of claim 1, in which the first temperature range is up to 80 degrees Celsius and the second temperature range from 80 to 120 degrees Celsius.

4. The system of claim 1, in which the capture medium is a sorbent material operable to capture carbon dioxide by a sorbing process at the first temperature range and a desorbing process at the second temperature range.

5. The system of claim 4, wherein the capture medium comprises one of:
   an adsorbent; or
   an absorbent.

6. The system of claim 4, wherein the capture medium comprises an ion-exchange material.

7. The system of claim 1, in which the heat engine comprises a first heat engine and a second heat engine in series, wherein the at least a portion of the working fluid is discharged between the first heat engine and the second heat engine.

8. The system of claim 7, the first heat engine is configured to operate between the inlet temperature and the discharge temperature, and the second heat engine is configured to operate between an intermediate temperature and an outlet temperature, wherein the intermediate temperature is less than the discharge temperature.

9. The system of claim 1, in which the heat engine is a multistage turbine having a first stage and final stage, and the at least a portion of the working fluid is discharged at a discharge station between the first stage and the final stage.

10. A cogeneration plant for generation of electricity and capture of atmospheric carbon dioxide, comprising
    the system of claim 2; and
    a heat source for raising the temperature of the working fluid.

11. The cogeneration plant of claim 10, in which the heat source is a nuclear reactor.

12. The cogeneration plant of claim 11, in which the nuclear reactor is a gas-cooled reactor or a pressurised water reactor, and steam is provided by a steam generator in heat exchange relationship with the nuclear reactor.

13. The cogeneration plant of claim 11, in which the nuclear reactor is a boiling water reactor, and steam is provided by the boiling water reactor.

14. A method of capturing atmospheric carbon dioxide, comprising:
    generating steam;
    expanding the steam through a steam turbine and producing a steam exhaust;
    directing heat from the steam exhaust to a direct air carbon capture plant;
    transferring the heat in a heat exchanger configured to transfer heat from the steam to a separate, secondary fluid that conveys the heat to a carbon dioxide capture medium; and
    desorbing, by the heat, the carbon dioxide captured in the capture medium in the direct air carbon capture plant.

15. The method of claim 14, in which the steam is generated using heat from a nuclear reactor.

* * * * *